United States Patent [19]
Guyot

[11] Patent Number: 4,926,341
[45] Date of Patent: May 15, 1990

[54] METHOD AND APPARATUS FOR CALIBRATION OF BALANCING UNIT

[75] Inventor: Volker Guyot, Buttelborn, Fed. Rep. of Germany

[73] Assignee: Carl Schenck AG, Fed. Rep. of Germany

[21] Appl. No.: 108,488

[22] Filed: Oct. 14, 1987

[30] Foreign Application Priority Data

Dec. 24, 1986 [EP] European Pat. Off. ........ 86118074.3

[51] Int. Cl.⁵ ..................... G01M 1/16; G06F 15/20
[52] U.S. Cl. .................................. 364/508; 73/457; 73/462; 364/551.01; 364/571.01
[58] Field of Search .............. 364/463, 508, 551, 556, 364/571; 73/457, 462, 464; 33/203.18

[56] References Cited

U.S. PATENT DOCUMENTS

| | | | |
|---|---|---|---|
| 4,262,536 | 4/1981 | Orem et al. | 73/462 |
| 4,274,287 | 6/1981 | Kaneda | 73/457 |
| 4,348,885 | 9/1982 | Mueller | 73/462 |
| 4,357,832 | 11/1982 | Blackburn et al. | 73/462 |
| 4,450,529 | 5/1984 | Hill et al. | 73/462 |
| 4,510,809 | 4/1985 | Fillion | 73/457 |
| 4,545,021 | 10/1985 | Suzuki et al. | 73/457 |
| 4,555,943 | 12/1985 | Ohta et al. | 73/457 |
| 4,626,147 | 12/1986 | Nystuen et al. | 364/508 |
| 4,646,570 | 3/1987 | Schoenfeld | 73/462 |

FOREIGN PATENT DOCUMENTS 3017240  2/1985  Fed. Rep. of Germany.

Primary Examiner—Kevin J. Teska

[57] ABSTRACT

An unbalance measuring procedure and circuitry therefor employs correction weights for the compensation of unbalance of a rotating component under test. After a measuring run, stored and displayed unbalance information is compensated by a compensating weight at the angular position displayed and a control run is carried out, the results of which are also stored and displayed. The balancing is interrupted and ended if a low level threshold value is not reached. For purposes of automatic adaptation of a balancing unit, the measurement run is simultaneously used as a control and calibration run to check the balancing quality obtained by the initial placement of a compensating weight.

4 Claims, 2 Drawing Sheets

METHOD AND APPARATUS FOR CALIBRATION OF BALANCING UNIT

BACKGROUND OF THE INVENTION

The present invention relates to a method and apparatus for the calibration of a balancing unit for the balancing of mounted vehicle wheels. Such apparatus includes a display unit for the magnitude and angular position of unbalance and circuitry for processing of unbalance vibrations picked up by transducers. Circuitry is also included for the processing of the angular position of the unbalance derived from the unbalance measuring unit. Unbalance compensation weights are used to compensate the unbalance on the vehicle wheel. Unbalance information displayed and stored during a measurement run is compensated by a correction weight of the indicated magnitude and indicated angular position. A check run is carried out, the results of which are stored and displayed, and the balancing procedure is discontinued when a tolerance limit is not exceeded.

Rotating machinery components in operation are subjected to wear because of dirt or abrasion and often show distortions as a result of false clamping. Such components are tested from time to time for smooth running within certain intervals by means of so-called trim balancing or field balancing. If possible, the dynamic balancing compensation obtained with stationary balancing machines should not be changed. Examples for such rotating components are universal joint driveshafts for large machinery, fans and blowers, turbines of stationary machines and automotive driveshafts, brake drums and wheels on vehicles as rotating components on moveable machinery.

Vehicle mounted wheels, if balanced on the vehicle, are often driven by means of a friction drive whereby the automobile is elevated on the axle to be investigated so that the wheel is free to rotate. Driving wheels of an automobile can also be driven, after being lifted, by means of the car's engine. No further preparation of the wheels with regard to balancing is done.

Balancing weights already in position remain on the wheel and additional balancing weights are positioned during the balancing of the vehicle mounted wheels. Removal of the originally positioned balancing weights is not done. Were these weights removed, the dynamic balance obtained on a stationary balancing machine would be affected.

In German Pat. No. DE-PS 30 17 240, a device is disclosed for the determination of the unbalance of mounted motor vehicle wheels in which a vibration transducer is provided for the measurement of the forces or vibrations caused by the unbalance of a vehicle wheel. The vehicle wheel is elevated and means is provided for rotating the elevated vehicle. A measuring device functions to determine the direction and magnitude of unbalance. The displayed value of unbalance is adjusted by means of two test runs, one run with and one run without a balancing weight of known magnitude. In order to accurately determine the unbalance of the vehicle mounted wheels, means are proposed through which directly, from the indicated magnitude of unbalance, the magnitude of the compensating weight to be installed can be determined. Also proposed is the provision of two parallel memories in which the values of unbalance are stored in both memories as to magnitude and direction during the first test run. A subsequent subtractor gives the difference between the values stored during the first measuring run and the measured values of the second measuring run. These differences are forwarded to an indicator. The measured and stored unbalance value is correctly shown on the display without an additional measuring run. By means of this device, the indication of the magnitude of unbalance is calibrated in measuring runs so that the unbalance compensation can be subsequently carried out on the vehicle mounted wheels.

Such a calibration of the balancing equipment is time consuming because of the absolute necessity of measurement and control runs. Furthermore, for such calibration the device of in DE-PS No. 30 17 240, two measurement runs are required, and this calibration is carried out only once per automobile. This necessarily leads to errors in compensation when, for instance, because of different wheel suspensions, different vibratory characteristics prevail for each wheel. To avoid this deficiency, each wheel would have to be measured by means of a measuring run and a control run and subsequently the unbalance measuring unit would have to be recalibrated. Furthermore, with this measuring unit, it is not possible to conclude as to the correct results based merely on the difference between the test and control run. The calibration run is mandatory.

U.S. Pat. No. 3,678,761 discloses method and means for the calibration of the unbalance measuring unit with respect to the vibratory characteristics of the automobile wheel to be investigated. For this a compensating weight is positioned on a known wheel location.

Based on the known weight and the already existing unbalance, the measured and displayed amount of unbalance and the angle of its position are adjusted by means of electrical adjustment controls until the display corresponds to the known magnitude.

SUMMARY OF THE INVENTION

With the above as background, it is an object of the present invention to provide a procedure and apparatus for constrained adjustment of a balancing unit based upon measurements, through results. This is accomplished by calibration with the vibration data of the particular machine-carried rotating component. It is another object of the present invention to provide circuitry for the foregoing.

Should calibration become necessary, the last measuring run as a control run becomes the calibration run. The amount of unbalance indicated and the angle of unbalance displayed after the calibration run characterize the amount of unbalance to be compensated at the corresponding location of the rotating component. This positive calibration avoids not only the two measuring runs which are necessary with the present state of the art devices but, in addition, the second measuring run on the rotating component indicates, as a control run, either the correctness of the previous measurement, or as a calibration run it indicates the required compensation weight at the corresponding location.

For the first time the various vibratory conditions that especially occur on mounted automobile wheels from wheel to wheel are determined, and simultaneously therewith the effect of these conditions on the unbalance measurement is eliminated through the positive calibration of the unbalance measuring unit. The same result is achieved, for instance, in the case of balancing brake drums mounted on vehicles.

A modification of the inventive method includes use of weight stepped balancing weights. In this case, the control run also immediately becomes the calibration run with indication of the correct amount of unbalance and the correct unbalance angle location. With a balancing unit that operates in accordance with this inventive modification, even an "unstepped" magnitude of balancing weight will be indicated after a control run so that the operator by manipulation of the new compensation weight to be inserted can match the weight indicated in the control run.

Another modification of the invention for weight stepped compensation weights includes positive stepping method wherein only those values that can be compensated with stepped compensation weights are indicated.

In a further modification of the invention a zero is displayed during a run when the input tolerance value for permissible difference between the measured unbalance value and the residual unbalance including angular position that occurs during the control run is not exceeded.

The method according to the present invention is unique because the first run is a measuring run where the amount of unbalance as well as the angular position of the unbalance are indicated. According to these values, a compensating weight is positioned. The measurement run following this procedure shows whether the now balanced rotating component was indeed balanced with the previous calibration of the measuring unit.

If the calibration is incorrect, which is shown by a different read-out, a switch-over is made, and as a result, this measurement run, as a control run, becomes a calibration run and a new amount of unbalance and angular position is displayed. These values are determined with the help of the unbalance compensation weight already in place. So the measuring unit is calibrated with respect to the new vibratory conditions so that at the end of the run only the first weight must be removed and a new weight of the measured amount is placed in the indicated peripheral position. After placement of this compensating weight, a new test run for this component is not required and subsequently the next rotating component mounted on the same machine can be tested for unbalance with the now existing calibration. Thereby all previously required investigative runs with relocated, enlarged or reduced compensating weights in several measuring runs are eliminated for the other wheels of an automobile under test while according to the state of the art, because of the previously names process only one calibration was carried out per vehicle.

With the present invention, however, a combination of measurements of unbalance values and of calibration of the measuring unit with respect to measuring conditions is presented for the first time, whereby the calibration is positively included in the measurement.

A circuitry arrangement for performing the basic procedure of the invention includes a vibration transducer, an angle reference pick up, an unbalance measuring unit with memory for the determination of unbalance values, and an unbalance display unit. The circuitry also includes a calculator which is connected via a component to polar converter with a subtractor and which in turn is connected via a multi-position switch to the unbalance display unit. Via the test value memory with the output of a first component to polar converter, through the influence of the calculator via a further output of the unbalance measuring unit and through the connection of a command signal generator with the calculator, a determination of the new unbalance measurement values is obtained. Simultaneously therewith, an influence is provided to the unbalance measuring unit. The invention clearly shows for the first time a way, through the invented positive calibration of the measuring, to simultaneously adapt the amount of unbalance and the angular position of unbalance to the prevailing vibratory conditions. Hence, any rotating body to be tested while mounted on a machine can be quickly and correctly balanced.

Also, the unbalance measuring unit may provide a value of unbalance in vector form, i.e., in the form of angular position and magnitude. Alternatively, the value of unbalance may be in the form of vector components. In the inversely operated component to polar converter, the vector components of the unbalance value are generated by multiplication of the sine and cosine of the angle. This is accomplished in the component to polar converter. The magnitude of the unbalance value is determined from the square root of the sum of the squares of the vector components, while the angle is calculated from the arctangent of the components. One embodiment, according to the invention includes the use of an additional unbalance transducer and a further angle reference pickup with the unbalance measuring unit connected by a switch. Such circuitry according to the invention may be especially used in the case of the driving wheels of a vehicle which are lifted for measurement. This is done without repositioning of the one unbalance transducer after a control run upon the other wheel to be investigated and without repositioning the angular position generator, simply by switching a switch for the second wheel to be tested including brake drum or if the wheels have been removed, for the second brake drum to be tested.

The complete circuit may be a microprocessor system.

BRIEF DESCRIPTION OF THE DRAWINGS

Novel features and advantages of the present invention in addition to those mentioned above will become apparent to those of ordinary skill in the art from a reading of the following detailed description in conjunction with the accompanying drawing wherein similar reference characters refer to similar parts and in which.

DETAILED DESCRIPTION OF THE INVENTION

Figure 1:
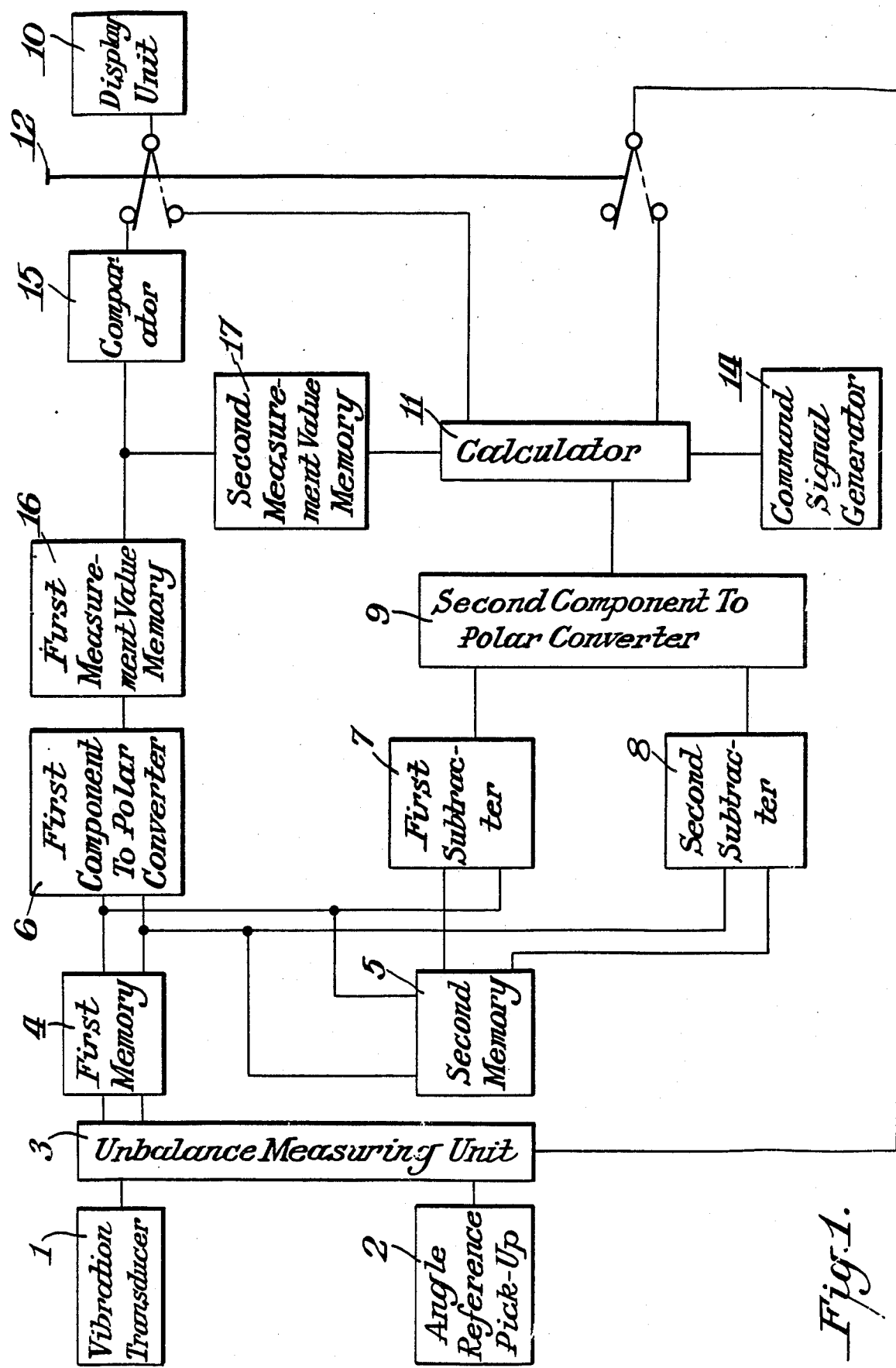
FIG. 1 is a schematic control circuit according to the present invention wherein the unbalance information appears at the output of the unbalance measuring unit in the form of scalar components.

As shown in FIG. 1, a vibration transducer 1 is arranged to pick up the unbalance vibration of a rotating part mounted on a machine (not shown). A signal from transducer 1 is transmitted to an unbalance measuring unit 3. An angle reference pick-up 2 is connected to the unbalance measuring unit 3, and as a result of markings on the rotating body, the angle reference pick-up provides information about these markings to the unbalance measuring unit during the measuring run.

This may apply to the driving wheels mounted on an automobile which, after lifting from the ground, are driven by the engine of the vehicle and where each wheel has been marked with angular reference markings. In the case of non-driven rotating components such as non-driven automobile wheels or brakes, which are tested separately after removal from the wheels, such rotating components are driven with incidental drive equipment such as friction drives.

In the unbalance measuring unit 3, the information generated during the measurement run from the vibration transducer 1 and from the angle reference pick-up 2 are processed so that the vertical and horizontal components of unbalance can be transferred into a first memory 4. These components contain information about the magnitude of unbalance and angular position. The first memory 4 is connected on the one hand with a further or second memory 5 and also with the first component to polar converter 6. Component to polar converters, such as described in German Pat. No. DE-PS 23 48 498, determine from the vector components of unbalance the amount and angle of the measured unbalance. In component to polar analyzer 6, the magnitude and angle of a measurement run are determined and sent separately to a first measurement value memory 16 where they are stored and transmitted via a comparator 15 and a multiposition switch 12 to display unit 10 for display. According to the value displayed, a compensating weight is placed on the rotating component at the indicated angular position. Because the comparator indicates at its output the input value unchanged, when it is above a tolerance threshold, and shows a value zero when the input value is below the tolerance threshold, the test run itself indicates the balancing quality in cases where there is no change in the condition of balance since the last trim balancing.

During the next measuring run, as control run for the quality of the positioned weight, the result, as already described for the first measurement run, is displayed in the display unit 10 and results in a transfer of the results obtained during the first measurement run. If the display shows "0" which occurs when the compensation was correct or when the unbalance is still below the set tolerance limit in comparator 15, the next rotating component, for instance the other drive wheel of the automobile can be measured. In the meantime, the values so far stored in the first memory 4 are transferred into the further or second memory 5 while in the first memory 4 only the measured values of the control run are stored. Similarly, the measured values from the first measurement run, stored according to magnitude and angular position in the first measurement memory 16 are transferred into a second measurement value memory 17 and stored. The first measurement value memory 16 stores the results from the control run.

The vertical and horizontal values of the effect of unbalance of the control run are taken from the first memory 4 and the corresponding values from the measurement run are taken from the further memory 5 and transferred to subtraction circuitry 7, 8. The results of the subtraction are sent to a further component to polar converter 9 where the magnitude and angular position of the differential unbalance is determined from their existing form as vector components.

The magnitude and angular position of the unbalance obtained by substraction comprises the output of component to polar converter 9. The magnitude and angular position of the unbalance obtained from the measurement run (output of memory 17) are entered into a calculator 11.

If the information displayed in the display unit 10 as a result of placing of the compensating weights after the first measurement run, is unequal to zero, the multiposition switch 12 is brought into the position indicated by the dotted line so that the calculator 11 is connected to the display 10. The calculator 11 determines the new amount of unbalance by division of the square of the unbalance value from the measurement run by the unbalance value of the difference between measurement and control runs. Through subtraction of the angle from the control run from twice the angle of the measurement run, the new unbalance angle is determined. To this end, known electronic multipliers and adders are used. Simultaneously, the existing calibration value contained in calculator 11 is replaced by a new calibration value which consists of the quotient of the unbalance value of the measurement run and the unbalance value of the difference between the measurement run and control run multiplied by the existing calibration value. With the multiposition switch 12 in the dotted line position, the new values of magnitude and angular position are supplied to the display unit 10 and the new calibration value is entered into the unbalance measuring unit 3.

Moreover, a command signal generator 14 is connected to calculator 11 for the purpose of predetermining the size of the compensating weight. This command signal generator 14 serves the purpose of being able to use weight stepped and stored compensation weights instead of the exactly indicated unbalance amount for the compensation.

For example, if the display unit 10 indicates a compensating weight of 17 gram, the command signal generator 14 enters the nearest stored compensation weight, such as 15 gram or 20 gram, into the calculator. There, the exact value is recalculated as a function of the entered value. Simultaneously therewith the angular position is also considered and the selected incremental weight together with the appropriate compensation weight is indicated.

The recalculation proceeds so that the exact value of the measurement run is multiplied by the entered weight stepped value. Simultaneously, the so derived new calibration value is automatically imposed on the unbalance measuring unit.

Figure 2:
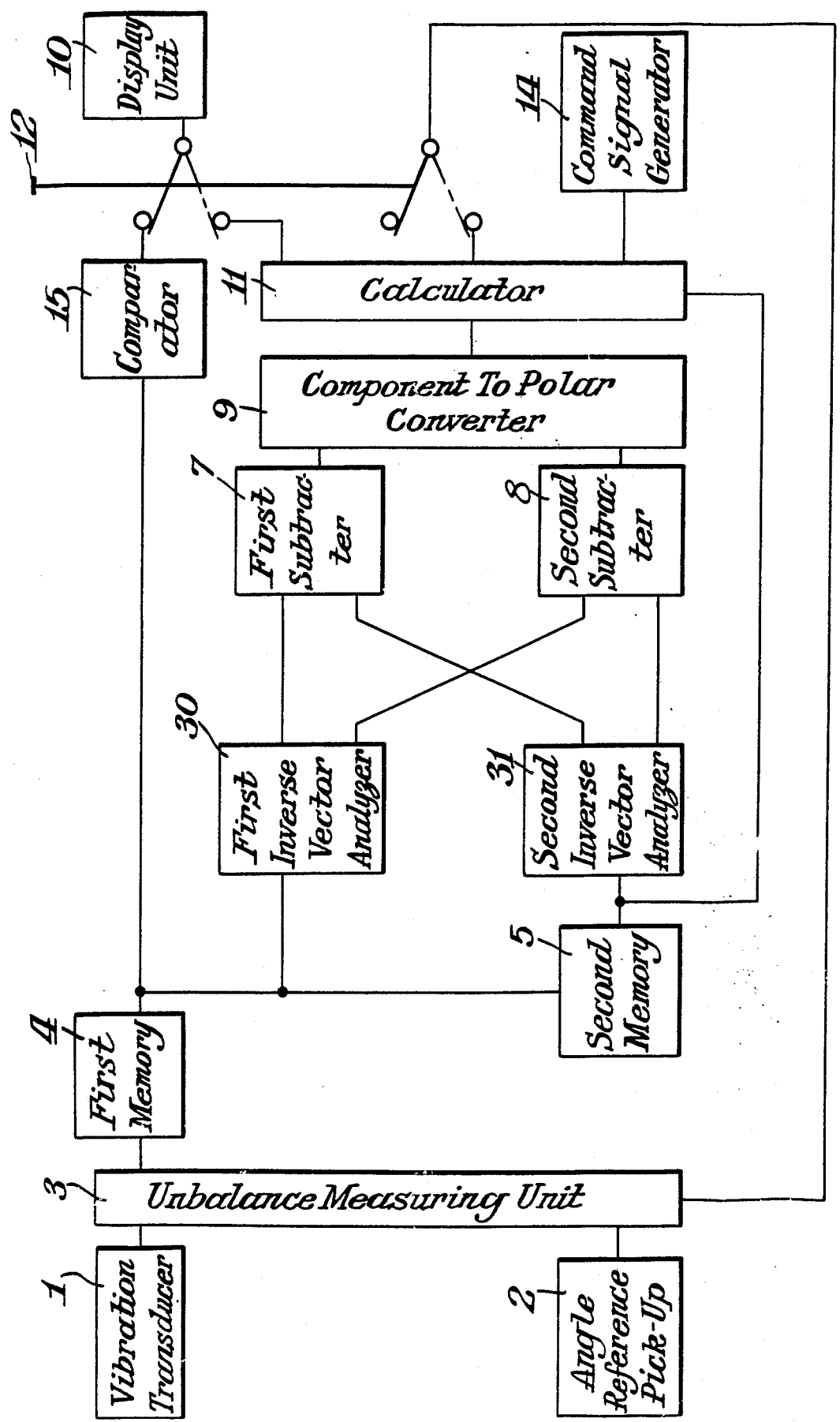
FIG. 2 is a schematic control circuit according to the present invention wherein the magnitude and angle of unbalance appears at the output of an unbalance measuring unit.

Another embodiment of the invention is shown in FIG. 2. The unbalance informations picked up by the vibration transducer 1 and the angle reference pickup 2 taken during the measurement run are transmitted to the unbalance measuring unit 3. At the output of the unbalance measuring unit, the unbalance is in the form of magnitude of unbalance and angular position. This information is sent to the first memory 4 and from there to the comparator 15 and then to the display unit 10. For this transfer, the multiposition switch 12 is positioned as shown by the solid line in FIG. 2. The weight shown by the display unit 10 is placed onto the automobile wheel at the angular position also shown by the display unit 10. During the next measurement run, which serves as a control run to check the quality of the placement of the weight, the result is displayed by the display unit 10, and causes a transfer of the results obtained in the first measurement run. If the display indicates "0", then the next rotating body may be tested, as already described in connection with FIG. 1. During this control run, however, the information from the first measurement run has been transferred into a further memory 5, and also into an inverse component to polar converter 30. These values are now further processes during the measurement run independent of the value to be shown via the comparator 15 in the display unit 10, as follows. From the further memory 5, the information is sent to a further inverse component to polar converter or polar to component converter 31. At the input of the inverse component to polar converter 31, the information regarding magnitude and angle of the first measurement run is present while at the inverse component to polar converter 30 the information regarding magnitude and angle from the control run is present. The inverse component to polar converters now proceed to calculate the components regarding magnitude and angle of existing unbalance values, so that at the output of the inverse component to polar converter 30 the components from the control run are present and at the output of the inverse component to polar converter 31 the vector components of the measurement run are present.

As described with FIG. 1, these values are now entered into the subtraction circuitry 7, 8, the results of which are then transformed through the further component to polar converted 9 into an unbalance difference as to magniturde and angle. These values and those values derived from the measurement run are entered into the calculator 11. There, processing the values proceeds as described in FIG. 1. Also, in case the display unit 10 indicates during the control run a value different from "0", the switch 12 is placed in the "dotted line" position so that the calculator is connected to the display unit 10. Here again, as already described with regard to FIG. 1, the newly generated calibration value is automatically imposed upon the unbalance measuring unit.

What is claimed is:

1. In a method for adjusting a balancing unit comprising the steps of providing unbalance measuring means having display units associated therewith for an angular position of unbalance and an unbalance magnitude, utilizing circuitry for processing of unbalance vibrations picked up by a vibration transducer and also for processing an angular position of unbalance, utilizing weights from a supply of graded unbalance compensating weights for compensating unbalance of a component under test, displaying in the display units and storing in a first memory unbalance information after a measurement run to compensate unbalance of a component under test with a compensating weight of a magnitude and angular position relating to the displayed unbalance information, performing a subsequent control run, displaying and storing the unbalance information of the control run, and terminating any further runs when the difference between the measurement run and subsequent control run does not exceed a predetermined amount, the improvement including the steps of positively transferring the stored unbalance information from the measurement run to a second memory during the subsequent control run, positively replacing the unbalance information of the measurement run with the unbalance information of the control run when the difference exceeds the predetermined amount so that the control run then becomes a calibration run, subtracting the unbalance information of the measurement run and the calibration run from one another to thereby provide differential unbalance information, converting the differential unbalance information into vectorial parameters and converting the unbalance information of the measurement run into vectorial parameters, calculating new unbalance information from the vectorial components of both the measurement run and the differential unbalance information from the measurement and control runs, indicating a new compensating weight and new angular position of unbalance based upon the new unbalance information, using the indicated compensating weight and angular position of unbalance to balance the component under test, and adjusting the balancing unit based upon the new unbalance information.

2. A method as in claim 1 including the step of displaying "0" when the difference between the measurement and control runs does not exceed the predetermined amount.

3. A balancing unit comprising an unbalance transducer, an angle reference pick-up, an unbalance measuring unit for the determination of unbalance information connected to the unbalance transducer and the angle reference pick-up, a first memory connected with the unbalance measuring unit for storing unbalance information of a measurement run, a second memory connected to the first memory, a first component to polar converter connected to the first memory, a first value memory connected to the component to polar converter, a comparator connected to the first value memory, a display unit connected to the comparator, a multiposition switch between the comparator and the display unit, a first subtraction device connected to the first memory and a second subtraction device connected to the second memory, a second component to polar converter connected to the first and second subtraction devices, a calculator connected between the second component to polar converter and the multiposition switch, a second value memory connected between the calculator and a line extending between the first value memory and the comparator, a line connecting the unbalance measurement unit and the calculator with the multiposition switch therebetween, and a command signal generator connected to the calculator to supply a predetermined weight value.

4. A balancing unit comprising an unbalance transducer, an angle reference pick up, an unbalance measuring unit for the determination of unbalance information connected to the unbalance transducer and the angle reference pick-up, a first memory connected with the unbalance measuring device for storing unbalance information of a measurement run, a second memory connected to the first memory, a first component to polar converter connected to the first and second memories, a comparator connected to the first memory, a display unit connected to the comparator, a multiposition switch connected between the comparator and the display unit, a first subtraction device connected to the first memory and a second subtraction device connected to the second memory, a second component to polar converter connected to the first and second subtraction devices, a calculator connected to the second component to polar converter, a line interconnecting the calculator and the display device with the multiposition switch therebetween, a line connecting the unbalance measurement unit and calculator with the multiposition switch therebetween, and a command signal generator connected to the calculator to supply a predetermined weight value.

* * * * *